United States Patent
Di et al.

(10) Patent No.: US 10,713,172 B2
(45) Date of Patent: Jul. 14, 2020

(54) PROCESSOR CACHE WITH INDEPENDENT PIPELINE TO EXPEDITE PREFETCH REQUEST

(71) Applicant: Shanghai Zhaoxin Semiconductor Co., Ltd., Shanghai (CN)

(72) Inventors: Qianli Di, Beijing (CN); Weili Li, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 186 days.

(21) Appl. No.: 15/810,906

(22) Filed: Nov. 13, 2017

(65) Prior Publication Data

US 2018/0307608 A1    Oct. 25, 2018

(30) Foreign Application Priority Data

Apr. 25, 2017   (CN) .......................... 2017 1 0278117

(51) Int. Cl.
*G06F 12/0862* (2016.01)
*G06F 13/16* (2006.01)
*G06F 9/38* (2018.01)

(52) U.S. Cl.
CPC ........ *G06F 12/0862* (2013.01); *G06F 9/3802* (2013.01); *G06F 9/3855* (2013.01);
(Continued)

(58) Field of Classification Search
CPC ............... G06F 3/00; G06F 3/06–0689; G06F 5/00–16; G06F 9/00–548;
(Continued)

(56) References Cited

U.S. PATENT DOCUMENTS 4,530,052 A  *  7/1985  King .................. G06F 9/45537
                                                      711/200
4,598,365 A  *  7/1986  Boothroyd ............ G06F 9/3885
                                                      708/521

(Continued)

OTHER PUBLICATIONS

Definition of "directly"; Oxford University Press; The Oxford Dictionary and Thesaurus—American Edition, p. 401; ISBN 0-19-509949-4;1996 (Year: 1996).*

(Continued)

*Primary Examiner* — Daniel C. Chappell
(74) *Attorney, Agent, or Firm* — McClure, Qualey & Rodack, LLP

(57) ABSTRACT

A cache memory for a processor including an arbiter, a tag array and a request queue. The arbiter arbitrates among multiple memory access requests and provides a selected memory access request. The tag array has a first read port receiving the selected memory access request and has a second read port receiving a prefetch request from a prefetcher. The tag array makes a hit or miss determination of whether data requested by the selected memory access request or the prefetch request is stored in a corresponding data array. The request queue has a first write port for receiving the selected memory access request when it misses in the tag array, and has a second write port for receiving the prefetch request when it misses in the tag array. The additional read and write ports provide a separate and independent pipeline path for handing prefetch requests.

16 Claims, 3 Drawing Sheets

(52) U.S. Cl.
CPC ...... *G06F 13/1642* (2013.01); *G06F 13/1615* (2013.01); *G06F 2212/6024* (2013.01)

(58) Field of Classification Search
CPC ..... G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–4559; G06F 2201/00–885; G06F 2206/00–20; G06F 2209/00–549; G06F 2211/00–902; G06F 2212/00–7211; G06F 2213/00–4004; G06F 2221/00–2153
See application file for complete search history.

(56) References Cited

U.S. PATENT DOCUMENTS

| | | | | |
|---|---|---|---|---|
| 4,691,277 | A * | 9/1987 | Kronstadt | G06F 9/3806 711/213 |
| 4,719,568 | A * | 1/1988 | Carrubba | G06F 9/30047 711/123 |
| 4,796,175 | A * | 1/1989 | Matsuo | G06F 9/3802 712/207 |
| 5,019,967 | A * | 5/1991 | Wheeler | G06F 9/3802 712/219 |
| 5,101,341 | A * | 3/1992 | Circello | G06F 9/30032 711/E12.046 |
| 5,357,617 | A * | 10/1994 | Davis | G06F 9/3802 712/23 |
| 5,511,178 | A * | 4/1996 | Takeda | G06F 9/381 711/125 |
| 5,619,667 | A * | 4/1997 | Henry | G06F 9/28 711/138 |
| 6,167,503 | A * | 12/2000 | Jouppi | G06F 9/3012 712/23 |
| 6,272,597 | B1 * | 8/2001 | Fu | G06F 12/0897 711/122 |
| 6,321,307 | B1 * | 11/2001 | Maguire | G06F 12/0835 711/146 |
| 7,181,572 | B2 * | 2/2007 | Walmsley | B41J 2/04505 711/128 |
| 2002/0065988 | A1 * | 5/2002 | Lasserre | G06F 1/206 711/122 |
| 2006/0067592 | A1 * | 3/2006 | Walmsley | B41J 2/2139 382/303 |
| 2008/0276067 | A1 * | 11/2008 | Chen | G06F 12/1027 711/206 |
| 2011/0173398 | A1 * | 7/2011 | Boyle | G06F 12/0862 711/137 |
| 2012/0210071 | A1 * | 8/2012 | Black | G06F 15/167 711/130 |
| 2014/0297965 | A1 * | 10/2014 | Jayaseelan | G06F 12/0862 711/137 |
| 2014/0317356 | A1 * | 10/2014 | Srinivasan | G06F 12/0862 711/137 |

OTHER PUBLICATIONS

D. Hardy and I. Puaut, "WCET Analysis of Multi-level Non-inclusive Set-Associative Instruction Caches," 2008 Real-Time Systems Symposium, Barcelona, 2008, pp. 456-466. (Year: 2008).*

B. Cogswell and Z. Segall, "MACS: a predictable architecture for real time systems," [1991] Proceedings Twelfth Real-Time Systems Symposium, San Antonio, TX, USA, 1991, pp. 296-305. (Year: 1991).*

Gwangsun Kim, Jiyun Jeong, John Kim, and Mark Stephenson. Sep. 2016. Automatically Exploiting Implicit Pipeline Parallelism from Multiple Dependent Kernels for GPUs. Proceedings of the 2016 International Conference on Parallel Architectures and Compilation, pp. 341-352 (Year: 2016).*

* cited by examiner

PROCESSOR CACHE WITH INDEPENDENT PIPELINE TO EXPEDITE PREFETCH REQUEST

CROSS REFERENCE TO RELATED APPLICATIONS

This application claims the benefit of China Patent Application No. 201710278117.X, filed on Apr. 25, 2017, the entirety of which is incorporated by reference herein.

BACKGROUND OF THE INVENTION

Field of the Invention

The present invention relates in general to prefetching information for a processor, and more particularly to a processor cache with an independent pipeline for a corresponding prefetcher that expedites prefetch requests.

Description of the Related Art

Processors continue to become more powerful with greater performance at higher efficiency levels. The term "processor" as used herein refers to any type of processing unit, including a microprocessor, a central processing unit (CPU), a processor integrated circuit (IC) or chip with one or more processing cores, a microcontroller, etc. The term "processor" as used herein also includes any type of processor configuration, such as processing units integrated on a chip or IC including those incorporated within a system on a chip (SOC) or the like.

Memory access latency is a significant factor that impacts processing performance and efficiency. Processing circuitry is often separated from main memory through multiple layers of circuitry and associated access protocols. For example, a processor may be coupled to an external system memory that stores information needed by the processor, such as instructions (e.g., code), data and other information. Access to the external system memory may be relatively slow since the information must often traverse multiple levels of circuitry, such as a bus interface unit and/or a memory controller or the like, and the external devices often operate with a slower system clock as compared to a faster processor or core clock.

In order to improve performance and efficiency, processors typically incorporate one or more levels of cache memory that locally stores information retrieved from external memory for faster access by processing circuitry. Access to an internal cache is substantially faster since the cache is physically closer, has fewer intermediate circuitry levels, and often operates at a faster clock speed. The processor executes load-type instructions with an address for accessing the requested information (e.g., data or instructions). When the requested information is located in an internal cache invoking a cache hit, the information is retrieved with reduced latency (depending upon the cache level in which the information resides) as compared to the system memory. Otherwise, a cache miss occurs and the information is retrieved from the system memory located external to the processor with greater latency as compared to internal cache memory. The retrieved information may be in the form of one or more cache lines incorporating the requested information.

Prefetching is an important technique in which blocks (e.g., one or more cache lines) of information are retrieved from external system memory in advance and stored into the local processor cache(s) for faster access by the processing circuitry when needed. In general, a "prefetcher" or prefetch engine monitors or tracks information (data and/or code) actually requested and/or retrieved by the processor and attempts to anticipate future requests, and then submits speculative prefetch requests to retrieve the anticipated information. An ideal prefetcher attempts to ensure that most, if not all memory access addresses and corresponding data are within the cache memory before the processor actually requests the information, which significantly reduces data access penalty.

Performance and efficiency, however, are only improved when the processor actually requests a significant proportion of the requested information in a timely fashion. A prefetching algorithm that does not retrieve the requested information in time, or otherwise retrieves too much of the wrong information too quickly, may negatively impact overall performance and efficiency. The size of the cache memory is limited, so that an overly aggressive prefetcher that prefetches information too quickly may result in a "cache pollution" situation in which the cache memory is stuffed with information that is ultimately not used. Conventional prefetch algorithms are based on a significant level of research focused on just-in-time prefetching while attempting to avoid or otherwise reduce cache pollution to save room for more useful information.

SUMMARY OF THE INVENTION

A cache memory for a processor according to one embodiment includes an arbiter, a tag array and a request queue. The arbiter arbitrates among multiple memory access requests and provides a selected memory access request. The tag array has a first read port receiving the selected memory access request and has a second read port receiving a prefetch request from a prefetcher. The tag array makes a hit or miss determination of whether data requested by the selected memory access request or the prefetch request is stored in a corresponding data array. The request queue has a first write port for receiving the selected memory access request when it misses in the tag array, and has a second write port for receiving the prefetch request when it misses in the tag array.

The additional read and write ports provide a separate and independent pipeline path for handing prefetch requests. Thus, the prefetch requests are removed from the arbitration process and provided via an independent pipeline path in the cache memory. In this manner, prefetch requests do not contend with higher priority requests and may proceed in an independent manner via the separate pipeline path.

The tag array may be implemented as a first tag array having the first read port for receiving the selected memory access request, and a virtual tag array having the second read port for receiving the prefetch request. The virtual tag array is separate from, and in parallel with, the first tag array. The virtual tag array may store multiple virtual address tags corresponding to data stored in the data array. The virtual tag array may include multiple read ports for receiving multiple prefetch requests from the prefetcher in parallel.

A processor according to one embodiment may include a memory access execution system, a prefetcher, and a cache memory system. The memory access execution system submits multiple memory access requests for accessing information stored in an external memory. The prefetcher submits a prefetch request to load information from the external memory that may be subsequently requested by the processor. The cache memory system stores information retrieved from the external memory, and may include a data array, an arbiter, a tag array and a request queue. The arbiter arbitrates among multiple memory access requests and provides a selected memory access request. The tag array has a first read port receiving the selected memory access request and has at least one second read port receiving the prefetch request from the prefetcher. The tag array makes a hit or miss determination of whether data requested by said selected memory access request or said prefetch request is stored in the data array. The request queue has a first write port for receiving the selected memory access request when the selected memory access request misses in the tag array, and has a second write port for receiving the prefetch request when the prefetch request misses in the tag array.

The memory access execution system may include at least one memory access pipeline for submitting load and store requests. The cache memory system may be a first level data cache that receives the prefetch request from the prefetcher.

A method of processing memory access requests by a cache memory of a processor according to one embodiment includes providing a tag array with first and second read ports for making hit or miss determinations of whether data requested by a selected memory access request or a prefetch request is stored in a corresponding data array, arbitrating among multiple memory access requests and providing the selected memory access request to the first read port of the tag array, providing prefetch requests to the second read port of the tag array, providing a request queue with first and second write ports, forwarding misses of the selected memory access request to the first write port of the request queue, and forwarding misses of the prefetch requests to the second write port of the request queue.

The method may include providing a first tag array having the first read port for receiving the selected memory access requests, and providing a virtual tag array having the second read port for receiving the prefetch requests. The method may include storing virtual address tags in the virtual tag array. The method may include providing the virtual tag array with multiple read ports for receiving multiple prefetch requests in parallel.

BRIEF DESCRIPTION OF THE DRAWINGS

The benefits, features, and advantages of the present invention will become better understood with regard to the following description, and accompanying drawings where.

DETAILED DESCRIPTION

The inventors have recognized the inefficiencies associated with conventional prefetchers that are based on simulation models that ignore the traffic conflicts between prefetch requests and other types of requests in the same pipeline. In many conventional configurations, prefetch requests arbitrate with other types of requests for access to the data pipeline of a cache memory. Prefetch requests, however, are speculative and thus are given the lowest priority. Higher priority requests can stall or even cause a prefetch request to be killed, so that the prefetch stream is delayed over time resulting in a significant prefetch penalty.

As described herein, the prefetch requests are instead removed from the arbitration process and provided via an independent pipeline path in the cache memory. In this manner, prefetch requests do not contend with higher priority requests and may proceed in an independent manner via a separate pipeline. As a result, the prefetch request hit/miss determination is made more quickly and in the event of a miss, the corresponding memory request to higher level caches and/or system memory is made significantly faster as compared with conventional configurations. Also, the prefetch request does not hinder other memory access requests, so that the normal arbitration path is not directly impacted by the prefetch requests. For example, prefetch requests do not block access the data array of the cache memory by the higher priority requests.

Figure 1:
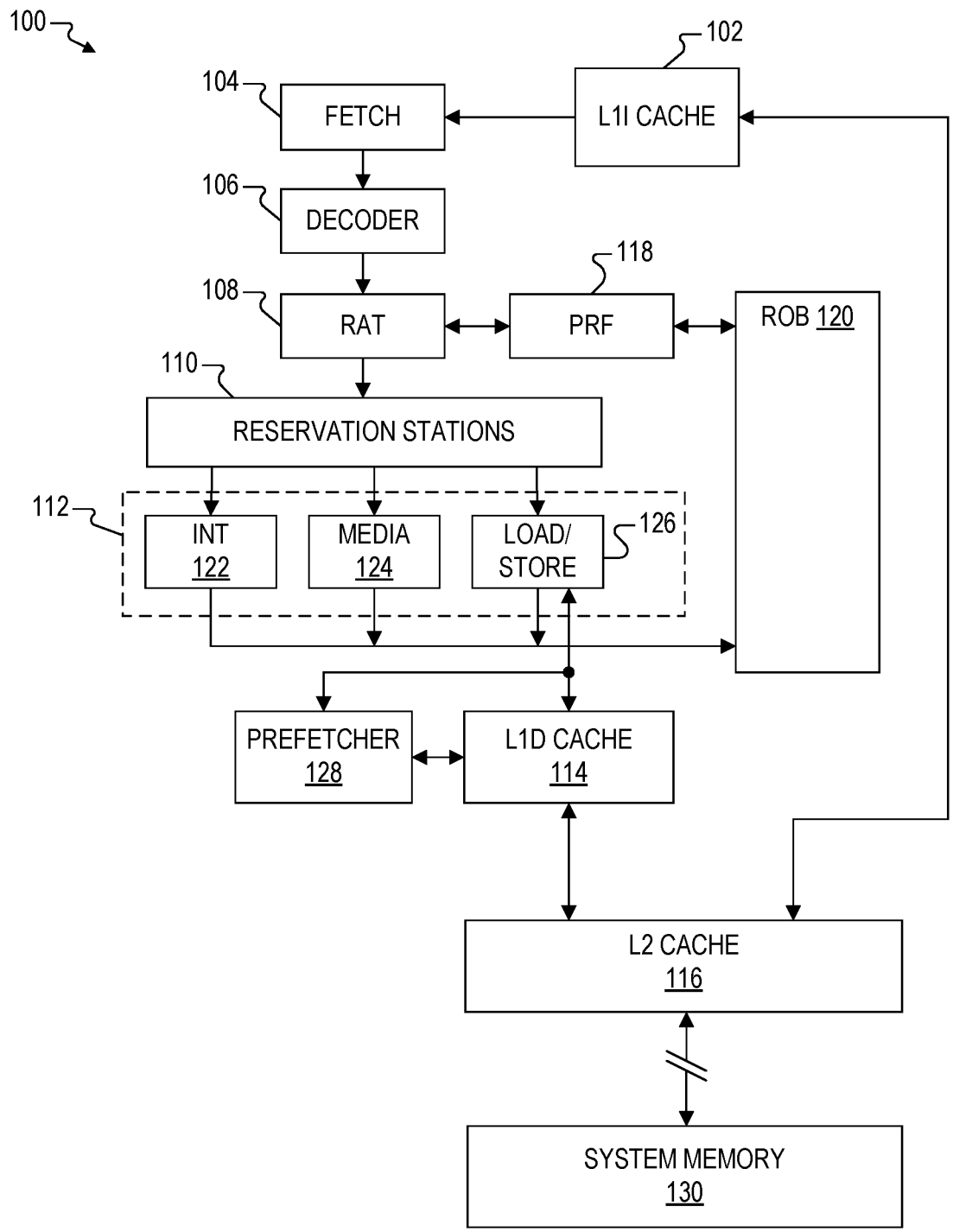
FIG. 1 is a simplified block diagram of a processor with a cache memory incorporating an independent pipeline implemented according to one embodiment of the present invention for handling prefetch requests.

FIG. 1 is a simplified block diagram of a processor 100 with a cache memory (e.g., L1D cache 114) incorporating an independent pipeline implemented according to one embodiment of the present invention for handling prefetch requests. The standard instruction set architecture (ISA) of the processor 100 may be an x86 architecture in which it can correctly execute a majority of the application programs that are designed to be executed on an x86 processor. In particular, the processor 100 may execute instructions of the x86 instruction set and may include the x86 user-visible register set. The present invention, however, is not limited to x86 architectures and may instead be implemented according to any alternative ISA as known by those of ordinary skill in the art.

The processor 100 includes a first level or level-1 instruction (L1I) cache 102, and a front end pipe including an instruction fetch (FETCH) engine 104, a decoder 106, and a register alias table (RAT) 108. The processor 100 further includes reservation stations 110, execution units 112, a level-1 data (L1D) cache 114, a second level or level-2 (L2) cache 116, a physical register file (PRF) 118 and a reorder buffer (ROB) 120. The L2 cache 116 further interfaces an external system memory 130 via a bus interface or memory controller or the like (not shown).

The execution units 112 may include one or more integer (INT) units 122, one or more floating point or media units 124, and one or more load and store (load/store) pipelines 126. The load/store pipelines 126 may be configured as separate load and store pipelines and/or load and store combination pipelines, and may further incorporate a memory order buffer (MOB) (not shown) or the like. The load/store pipelines 126 (one or more memory access pipelines) form a memory access execution system that executes memory access instructions, which may include load instructions to retrieve data from, and store instructions to store data to, the system memory 130 via any intermediate cache memories. The reservation stations 110 may include any combination of schedulers for dispatching instructions to the individual execution units 112. For example, separate integer, media and load/store schedulers may be included for dispatching instructions to the INT units 122, the media units 124 and the load/store pipelines 126, respectively.

The L1I cache 102 caches program instructions from an application located in the system memory 130 (or any other suitable memory). The fetch engine 104 fetches program instructions (e.g., macroinstructions or code) from the L1I cache 102 and forwards them to the decoder 106, which decodes them into microinstructions for execution by one or more of the execution units 112. In one embodiment, instruction translation is a process that translates the macroinstructions (or macro-ops) of a macroinstruction set of the processor 100 (such as the x86 instruction set architecture) into microinstructions (or micro-ops) of a microinstruction set architecture of the processor 100. As used herein, the macroinstructions and microinstructions may generally be referred to herein generally as "instructions" and more specifically as macro-ops and micro-ops, respectively. For example, a memory access instruction may be decoded into a sequence of micro-ops that includes one or more load or store micro-ops. An application is populated with macro-ops, which are converted by the decoder 106 into corresponding micro-ops that are part of the native instruction set of the processor 100. The RAT 108 generates dependency information for each instruction based on its program order, on the operand sources it specifies, and on renaming information.

The RAT 108 issues the decoded micro-ops and their associated dependency information to the RS 110. The RS 110 includes at least one queue that holds the instructions and dependency information received from the RAT 108. The RS 110 dispatches received instructions to corresponding ones of the execution units 112 when they are ready to be executed. An instruction is considered ready for execution when all of its dependencies are resolved. In conjunction with dispatching an instruction, the RAT 108 allocates an entry in the ROB 120 for the instruction. Thus, the instructions are allocated in program order into the ROB 120, which may be configured as a circular queue to ensure that the instructions are retired in program order. The RAT 108 may also provide the dependency information to the ROB 120 for storage in the instruction's entry therein. The RAT 108 further allocates or maps one or more physical registers within the PRF 118 for each instruction for storage of operands and results.

The results of the execution units 112 may be fed back to the ROB 120 to update corresponding registers within the PRF 118. In one embodiment, the RAT 108 maps architectural registers to physical registers in the PRF 118 and updates pointers or the like (not shown) in the ROB 120 corresponding to the instructions. The pointers in the ROB 120 may be updated during or after execution, and the pointers are used to update contents of registers within the PRF 118 during operation. The ROB 120 ultimately retires instructions in program order to ensure proper operation in accordance with the instructions of the application.

The L1I cache 102 is an L1 cache for handling program instructions or code retrieved from the system memory 130, whereas the L1D cache 114 is an L1 cache for handling data retrieved from or sent to the system memory 130. The L2 cache 116, on the other hand, may be a "unified" cache in that it incorporates both data and code information to and from the L1 caches 102 and 114. In such a cache hierarchy, the L1 caches are typically smaller and faster with fewer sets and/or ways, whereas the higher level caches (e.g., L2) are larger (and often slower). The processor 100 executes load-type instructions with an address for accessing the requested information (e.g., data or instructions). When the requested information is located in a corresponding L1 cache invoking a cache hit, the information is retrieved with minimal latency. Otherwise, if the requested information is located within the L2 cache 116, the information is retrieved with reduced latency since the L2 is much faster than any higher level caches (not shown) and/or system memory 130. Otherwise, a cache miss occurs and the information is retrieved from higher level caches and/or the system memory 130 with greater latency. The retrieved information may be in the form of one or more cache lines incorporating the requested information.

Any one or more up to all of the cache memories, including the L1I cache 102, the L1D cache 114, and the L2 cache 116, may include a prefetcher. A prefetcher monitors traffic or tracks information (data and/or code) actually requested and/or retrieved by the processor 100 and attempts to anticipate future requests, and then submits requests to retrieve the anticipated information. In the illustrated embodiment, a prefetcher 128 is provided that monitors memory access requests from the load/store pipelines 126 to the L1D cache 114 and may further monitor information stored within the L1D cache 114. The prefetcher 128 submits requests for prefetching data from the system memory 130 (and/or the L2 cache 116) to the L1D cache 114. The prefetcher 128 is shown coupled to the L1D cache 114, but may alternatively be incorporated within the L1D cache 114. The present invention is illustrated for the prefetcher 128 provided for the L1D cache 114, where it is understood that the inventive concepts may be applied to any other prefetchers within or otherwise associated with the other cache memories of the processor 100.

Figure 2:
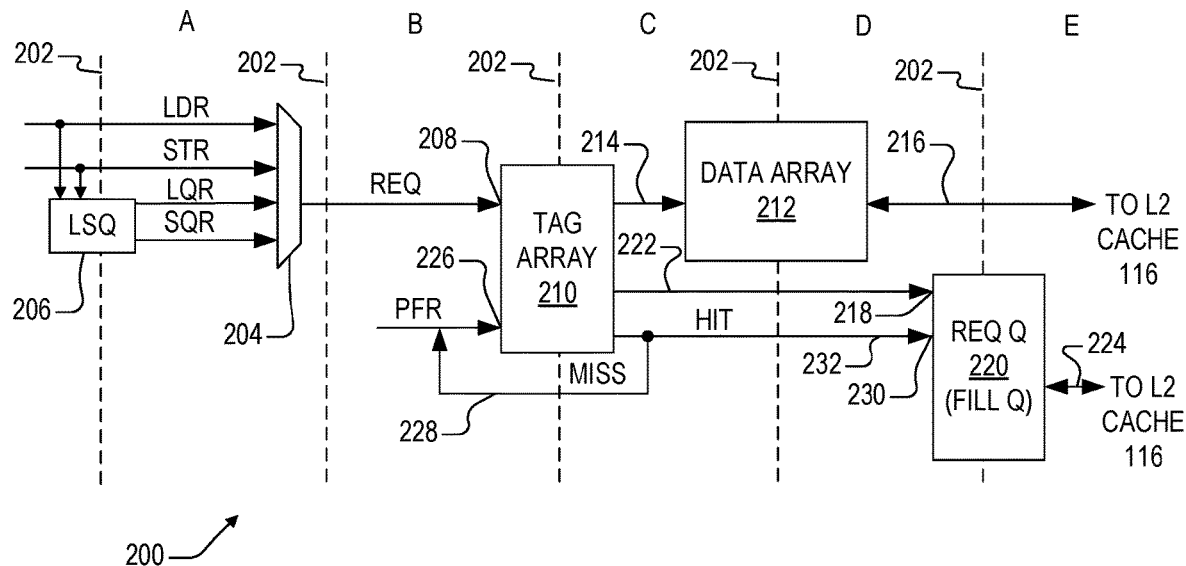
FIG. 2 is a more detailed block diagram of a cache memory implemented according to one embodiment of the present invention that may be used as the L1D cache of FIG. 1.

FIG. 2 is a more detailed block diagram of an L1D cache 200 implemented according to one embodiment of the present invention that may be used as the L1D cache 114. The L1D cache 200 is implemented as a pipelined structure with multiple stages A, B, C, D, and E, in which the stages are separated by synchronous latches or registers 202 illustrated by dashed lines. Load requests (LDR) and store requests (STR) are provided to respective inputs of an arbiter 204 and to respective inputs of a load/store queue (LSQ) 206. The LSQ 206 is shown in simplified form as a single block, where it is understood that the LSQ 206 may include separate load and store queues. The LSQ 206 also submits stored load requests (LQR) and stored store requests (SQR) to respective inputs of the arbiter 204. Although not shown, various other types of requests may be provided to other inputs of the arbiter 204, such as snoop requests, eviction requests, fill requests, etc. The load and store requests LDR and STR are provided from the load/store pipelines 126. If a new load request LDR or a new store request STR does not immediately win arbitration, then it is stored within the LSQ 206, which re-submits each stored request as LQR or SQR until it eventually wins arbitration. Furthermore, load and store requests remain in the LSQ 206 even after winning arbitration if they subsequently miss in the L1D cache 200 until the corresponding cache line(s) are retrieved to satisfy the request.

The arbiter 204 is shown in simplified form as a multiplexer (MUX) symbol. The arbiter 204 selects one of the multiple requests based on timing and/or priority and provides a winning (selected) request REQ to a first read port 208 of a tag array 210. In one embodiment, the L1D cache 200 is an N-way set associative cache. Each request includes an address, in which an upper portion of the address forms a tag identifying a block or page in memory, and a next or mid portion of the address forms an index identifying one of multiple sets within the tag array 210 and a corresponding data array 212. A lower portion of the address may identify one or more bytes within a cache line. Load and store requests may specify and address and a data length identifying one or bytes within a cache line or possibly spanning two cache lines (e.g., unaligned memory access). A prefetch request, on the other hand, typically addresses an entire cache line. The data array 212 stores cache lines received from the L2 cache, which ultimately stores cache lines received from the system memory 130. In one embodiment, each cache line is 64 Bytes (B). Each set of each array includes N ways, in which each of the N ways of a given set within the data array 212 corresponds to a tag within the tag array 210. The present invention, however, is not limited to any particular address length, cache capacity, number of sets or ways, cache line size or tag size.

In the event that the selected request REQ "hits" the L1D cache 200, meaning that the address in the request matches an entry in the tag array 210 so that the data requested by the selected request REQ has been stored in the data array 212, then the corresponding memory location in the data array 212 is accessed via signal path 214. For example, data is retrieved from the data array 212 for load requests and written into the data array 212 for store requests. Data written into the data array 212 is eventually copied to the L2 cache 116 via signal path 216. In the event that the selected request REQ "misses" the L1D cache 200, meaning that the address in the request does not match any entries in the tag array 210 so that the data requested by the selected request REQ has not yet been stored in the data array 212, then the request is forwarded to a first write port 218 of a request queue (REQ Q) 220 via a signal path 222. The REQ Q 220, otherwise referred to as a "fill queue" or "fill Q," interfaces the L2 cache 116 to store requests for submission to the L2 cache 116. A load request, for example, is forwarded to the L2 cache 116 from the REQ Q 220 via signal path 224, which performs a similar inquiry to determine whether the data is stored within the L2 cache 116. If not, the L2 cache 116 retrieves the requested data from higher level caches and/or the system memory 130. The retrieved data is eventually provided to the L1D cache 200, which updates the data array 212 and the tag array 210. The corresponding load request LDR eventually accesses the retrieved data from the data array 212.

In conventional configurations, prefetch requests (PFR) from the prefetcher 128 were provided to yet another input of the arbiter 204 to contend with all of the other requests. Since prefetch requests are speculative in nature, they have a relatively low priority. Actual load and store requests have higher priority and thus were serviced before prefetch requests. Higher priority requests could stall or even cause the prefetcher 128 to kill a prefetch request for various reasons including excessive delay. Thus, the prefetch stream of conventional configurations were delayed which resulted in a significant prefetch penalty.

According to one embodiment of the present invention, the tag array 210 of the L1D cache 200 includes a second read port 226 for receiving prefetch requests PFR from the prefetcher 128. In the event of a hit, that is, the data requested by the prefetch request has already been stored in the L1D cache 200, the tag array 210 provides a hit indication 228 back to the prefetcher 128, and the prefetcher 128 need take no further action. In the event of a miss, that is, the data requested by the prefetch request has not yet been stored in the L1D cache 200, the tag array 210 forwards (or the prefetcher 128 provides) the prefetch request PFR to a second write port 230 of the REQ Q 220 via a signal path 232. In this manner, the prefetcher 128 can submit prefetch requests PFR without having to contend with any of the higher priority requests for access to the tag array 210. Also, the second read port 226 is separate and independent from the first read port 208, so that the prefetcher 128 can submit prefetch requests PFR and receive hit/miss responses immediately without interfering with requests from the arbiter 204. Furthermore, in the event of a miss, the prefetch requests PFR are forwarded to and stored in the REQ Q 220 without interfering with forwarded requests from the arbiter 204. There is no need to add any ports to the data array 212 since the prefetch requests PFR do not need direct access to the data array 212.

In summary, the L1D cache 200, which may be used as the L1D cache 114 of FIG. 1, includes the tag array 210 with a separate read port 226 and also includes the REQ Q 220 with a separate write port. The additional read and write ports collectively form a separate and independent path within the pipeline structure of the L1D cache 114 for receiving and responding to the prefetch requests PFR from the prefetcher 128. In this manner, the prefetch requests can be handled separately and in parallel with higher priority requests without interfering with the higher priority requests. Prefetch requests, therefore, are submitted without significant delay and without incurring prefetch penalties. The conventional prefetch penalty is avoided.

Figure 3:
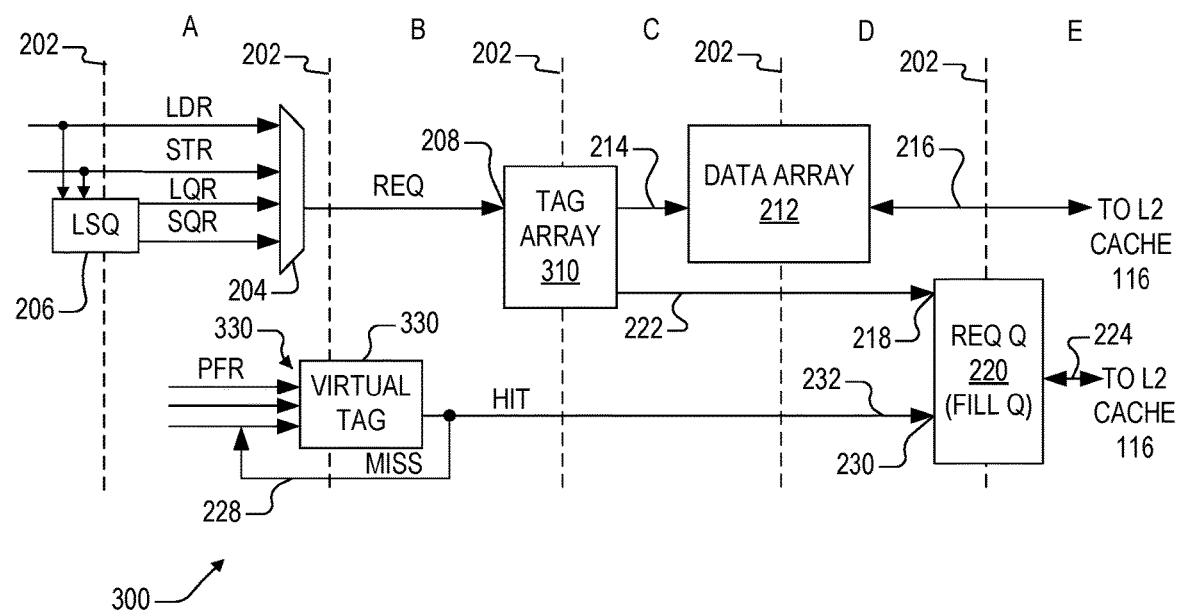
FIG. 3 is a more detailed block diagram of a cache memory implemented according to another embodiment of the present invention that may also be used as the L1D cache of FIG. 1.

FIG. 3 is a more detailed block diagram of an L1D cache 300 implemented according to another embodiment of the present invention that may also be used as the L1D cache 114 of FIG. 1. The L1D cache 300 is implemented in a similar manner as the L1D cache 200 and also has a pipelined structure with multiple stages A-E in which the stages are separated by the registers 202. The arbiter 204 and LSQ 206 are provided and operate in substantially the same manner to arbitrate among multiple requests including load and store requests for providing a selected request REQ. The tag array 210 is replaced by a tag array 310, which is configured in similar manner but without the second read port 226 for receiving prefetch requests PFR. The tag array 310 interfaces the data array 212 via signal path 214 and interfaces the REQ Q 220 via signal path 222 in substantially similar manner.

In this case, however, the tag array of the L1D cache 300 collectively includes the tag array 310 and a separate virtual tag array 330 with at least one read port 330 for receiving the prefetch requests PFR. The virtual tag array 330 interfaces the second write port 230 of the REQ Q 220 via the signal path 232 (instead of the tag array 310). The virtual tag array 330 and the additional write port 230 of the REQ Q 220 for the separate and independent path within the pipeline structure of the L1D cache 114 for receiving and responding to the prefetch requests PFR from the prefetcher 128. In addition, the virtual tag array 330 may be configured with multiple read ports 330 for handling multiple prefetch requests PFR in parallel without significant additional cost.

In many configurations the requests are submitted with a "virtual" (a.k.a., "linear") address (VA) that is not intended to be used to directly access the system memory 130 depending upon the memory access mode of operation of the processor 100. Instead, the virtual address is first converted to a physical address (PA) which may then be used to access the addressed information from the system memory 130. The translation is facilitated by a table walk engine or the like (not shown) that retrieves page tables from the system memory 130, in which the retrieved page table information is used to transform a received virtual address to a corresponding physical address. Once translated, the virtual address and its corresponding physical address are stored together in a translation look-aside buffer (TLB) (not shown). A separate TLB may be provided at multiple cache levels. The TLB is also a cache memory that avoids the time-consuming table walk process in the event that the translation is stored therein. A translation remains in the TLB until evicted according to a replacement policy, such as a least-recently used (LRU) policy or the like.

The virtual tag array 330 can be configured in substantially the same way as the tag array 310, such as using the same sets and ways. The difference is that the tag array 310 stores the physical address of the data in the data array 212, whereas the virtual tag array 330 stores virtual address tag corresponding to the data stored in the data array 212. In one embodiment, a virtual address tag can be a full virtual address, part of a virtual address or the hash of a virtual address. It is noted that the virtual address is translated into the physical address by using the retrieved page table information when paging is enabled. The virtual tag array 330 stores a copy of virtual addresses corresponding to the physical addresses in the tag array 310, and the prefetch requests PFR use virtual addresses so that the hit/miss information may be determined by the virtual tag array 330. In the event of a hit, the prefetcher 128 does not take any further action. In the event of a miss, the request is forwarded to the REQ Q 220. The corresponding physical address may be retrieved by the L2 cache 116, such as from its TLB or by performing a table walk or the like. It is noted that the virtual addresses of the prefetch requests PFR are directly used by the prefetcher 128 or are otherwise obtained much earlier than the physical addresses. As illustrated in the FIG. 3, the virtual addresses of the prefetch requests PFR could be obtained as early as in the A stage, thus the hit/miss information may be determined by the virtual tag array 330 as early as in the B stage, and that is earlier than the embodiment illustrated in the FIG. 2 (i.e., in the C stage).

The virtual tag array 330 is removed from the critical timing path of the tag array 310 and may be configured using a smaller and even slower memory type. The addresses of the prefetch requests PFR are determined relatively quickly and any additional delay of the slower virtual tag array 330 is relatively insignificant. For this reason, the virtual tag array 330 may be configured with multiple read ports 330 for handling multiple prefetch requests PFR in parallel without significant additional cost.

Figure 4:
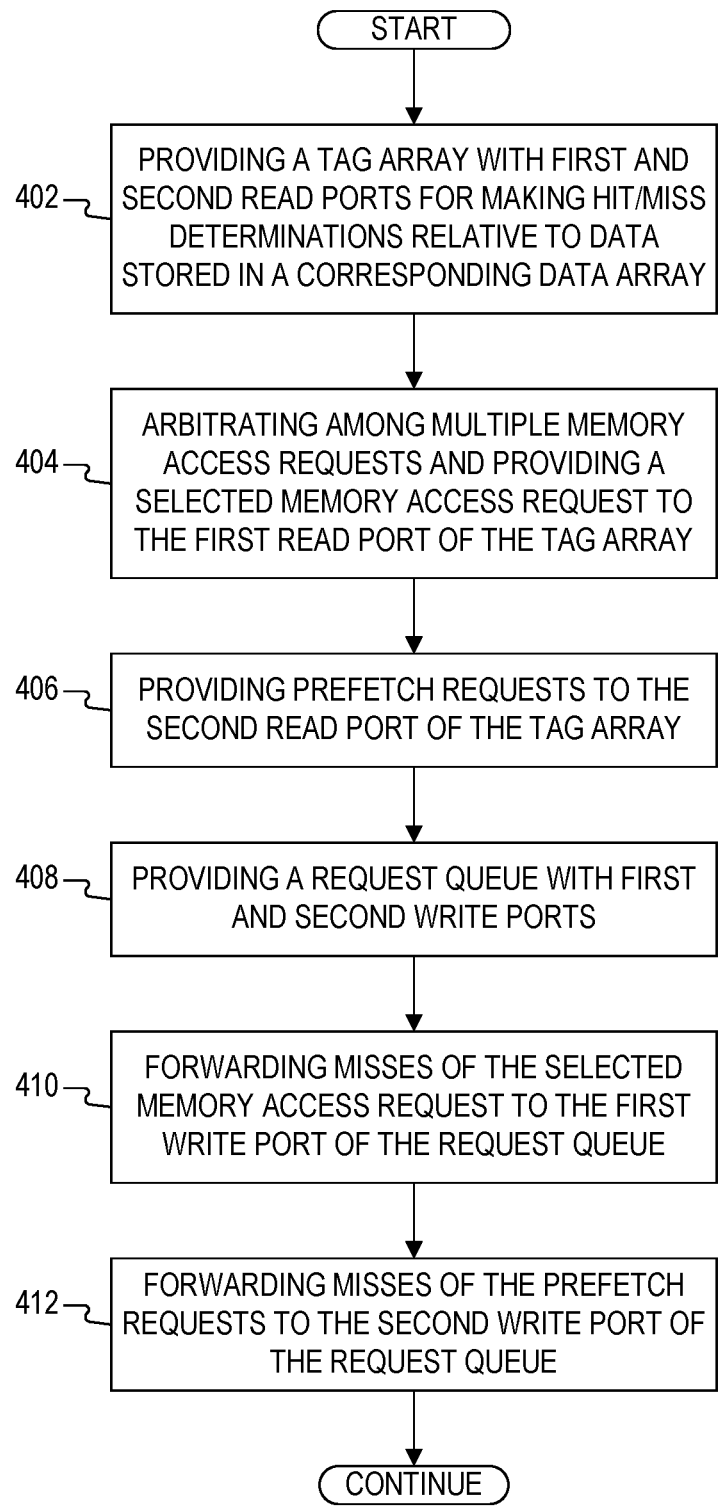
FIG. 4 is a flowchart diagram illustrating a method of processing memory access requests by a cache memory of a processor according to one embodiment of the present invention.

FIG. 4 is a flowchart diagram illustrating a method of processing memory access requests by a cache memory of a processor according to one embodiment of the present invention. The L1D cache 114 is exemplary as the cache memory, configured in any of various embodiments such as the L1D cache 200 of FIG. 2 or the L1D cache 300 of FIG. 3. At a first block 402, the method includes providing a tag array with first and second read ports for making hit or miss determinations relative to data stored in a corresponding data array. For example, the L1D cache 200 includes the tag array 210 with read ports 208 and 226 whereas the L1D cache 300 includes the tag array 310 with the read port 208 and the virtual tag array 330 with at least one read port 330.

At next block 404, the method may include arbitrating among multiple memory access requests and providing selected memory access requests to the first read port of the tag array. The arbiter 204, for example, arbitrates among load and store requests (e.g., LDR, STR, LQR, SQR) among other possible requests, and provides a selected memory access request REQ. REQ is provided to the read port of the tag array, such as the read port 208 of either of the tag arrays 210 or 310.

At next block 406, the method may include providing prefetch requests to the second read port of the tag array, such as the second read port 226 of the tag array 210 or the at least one read port 330 of the virtual tag array 330. The prefetch requests may be provided by a corresponding prefetcher, such as the prefetcher 128 of FIG. 1.

At next block 408, the method may include providing a request queue with first and second write ports, such as the REQ Q 220 with write ports 218 and 230. At this point, the additional read port(s) of the tag array and the additional write port of the request queue forms a parallel pipeline path for handling prefetch requests.

At next block 410, the method may include forwarding misses of the selected memory access request to the first write port of the request queue, such as shown via the signal path 222 to the write port 218 of the REQ Q 224.

At next block 412, the method may include forwarding misses of the prefetch requests to the second write port of the request queue, such as shown via the signal path 232 to the write port 230 of the REQ Q 224.

Operation continues in this manner for additional memory access and prefetch requests. The tag array may be implemented as a single tag array with multiple ports, such as the tag array 210, or as separate tag arrays, such as the tag array 310 and the virtual tag array 330. In the latter case, the method may include storing virtual address tags in the virtual tag array. In the latter case, the method may further include providing the virtual tag array with multiple read ports for receiving multiple prefetch requests at a time.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like. Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A cache memory for a processor, comprising:
  an arbiter that arbitrates among a plurality of memory access requests and that provides a selected memory access request;
  a tag array having a first read port receiving said selected memory access request and having a second read port receiving a prefetch request directly from a prefetcher, wherein said tag array makes a hit or miss determination of whether data requested by said selected memory access request or said prefetch request is stored in a corresponding data array;
  a request queue having a first write port for receiving said selected memory access request when said selected memory access request misses in said tag array, and having a second write port for receiving said prefetch request when said prefetch request misses in said tag array,
  wherein the second read port of the tag array and the second write port of the request queue forms a third signal path for handling said prefetch request without interfering with said selected memory access request;
a first signal path, wherein said tag array interfaces with said data array via said first signal path;
a second signal path, wherein said tag array interfaces with said first write port of said request queue via said second signal path in the event said selected memory access request misses in said tag array; and
said third signal path, wherein said tag array interfaces with said second write port of said request queue via said third signal path in the event said prefetch request misses in said tag array.

2. The cache memory of claim 1, wherein said tag array comprises:
a first tag array having said first read port for receiving said selected memory access request; and
a virtual tag array having said second read port for receiving said prefetch request.

3. The cache memory of claim 2, wherein said virtual tag array is separate from said first tag array and is provided in a parallel path with said first tag array.

4. The cache memory of claim 2, wherein said virtual tag array stores a plurality of virtual address tags corresponding to data stored in said data array.

5. The cache memory of claim 2, wherein said virtual tag array comprises a plurality of read ports for receiving a plurality of prefetch requests from said prefetcher in parallel.

6. A processor, comprising:
a memory access execution system that submits a plurality of memory access requests for accessing information stored in an external memory;
a prefetcher that submits a prefetch request to load information from the external memory that may be subsequently requested by the processor;
a cache memory system that stores information retrieved from the external memory, comprising:
a data array;
an arbiter that arbitrates among said plurality of memory access requests and that provides a selected memory access request;
a tag array having a first read port receiving said selected memory access request and having at least one second read port receiving said prefetch request directly from said prefetcher, wherein said tag array makes a hit or miss determination of whether data requested by said selected memory access request or said prefetch request is stored in said data array; and
a request queue having a first write port for receiving said selected memory access request when said selected memory access request misses in said tag array, and having a second write port for receiving said prefetch request when said prefetch request misses in said tag array,
wherein the second read port of the tag array and the second write port of the request queue forms a third signal path for handling said prefetch request without interfering with said selected memory access request;
a first signal path, wherein said tag array interfaces with said data array via said first signal path;
a second signal path, wherein said tag array interfaces with said first write port of said request queue via said second signal path in the event said selected memory access request misses in said tag array; and
said third signal path, wherein said tag array interfaces with said second write port of said request queue via said third signal path in the event said prefetch request misses in said tag array.

7. The processor of claim 6, wherein said tag array comprises:
a first tag array having said first read port for receiving said selected memory access request; and
a virtual tag array having said second read port for receiving said prefetch request.

8. The processor of claim 7, wherein said virtual tag array is separate from said first tag array and is provided in parallel with said first tag array.

9. The processor of claim 7, wherein said virtual tag array stores a plurality of virtual addresses corresponding to data stored in said data array in parallel.

10. The processor of claim 7, wherein said virtual tag array comprises a plurality of read ports for processing a plurality of simultaneous prefetch requests in parallel.

11. The processor of claim 6, wherein said memory access execution system comprises at least one memory access pipeline for submitting load and store requests.

12. The processor of claim 6, wherein said cache memory system comprises a first level data cache that receives said prefetch request from said prefetcher.

13. A method of processing memory access requests by a cache memory of a processor, comprising:
providing a tag array with first and second read ports for making hit or miss determinations of whether data requested by a selected memory access request or a prefetch request is stored in a corresponding data array;
arbitrating among a plurality of memory access requests and providing said selected memory access request to the first read port of the tag array;
providing prefetch requests directly from a prefetcher to the second read port of the tag array;
providing a request queue with first and second write ports;
forwarding misses of the selected memory access request to the first write port of the request queue;
forwarding misses of the prefetch requests to the second write port of the request queue,
wherein the second read port of the tag array and the second write port of the request queue forms a third signal path for handling said prefetch request without interfering with said selected memory access request;
interfacing a tag array with said data array via a first signal path;
interfacing said tag array with said first write port of said request queue via a second signal path, in the event said selected memory access request misses in said tag array; and
interfacing said tag array with said second write port of said request queue via a third signal path, in the event said prefetch request misses in said tag array.

14. The method of claim 13, wherein said providing said tag array with first and second read ports comprises:
providing a first tag array having the first read port for receiving the selected memory access requests; and
providing a virtual tag array having the second read port for receiving the prefetch requests.

15. The method of claim 14, further comprising storing virtual address tags in the virtual tag array.

16. The method of claim 14, further comprising providing the virtual tag array with a plurality of read ports for receiving a plurality of prefetch requests in parallel.

* * * * *